(12) United States Patent
Lee et al.

(10) Patent No.: US 12,321,288 B2
(45) Date of Patent: Jun. 3, 2025

(54) ASYMMETRIC READ-WRITE SEQUENCE FOR INTERCONNECTED DIES

(71) Applicant: Micron Technology, Inc., Boise, ID (US)

(72) Inventors: Hyun Yoo Lee, Boise, ID (US); Kang-Yong Kim, Boise, ID (US); Jason McBride Brown, Austin, TX (US); Venkatraghavan Bringivijayaraghavan, Hyderabad (IN); Vijayakrishna J. Vankayala, Allen, TX (US)

(73) Assignee: Micron Technology, Inc., Boise, ID (US)

( * ) Notice: Subject to any disclaimer, the term of this patent is extended or adjusted under 35 U.S.C. 154(b) by 172 days.

(21) Appl. No.: 17/823,443

(22) Filed: Aug. 30, 2022

(65) Prior Publication Data

US 2024/0070093 A1 Feb. 29, 2024

(51) Int. Cl.
*G06F 13/16* (2006.01)
*G06F 13/40* (2006.01)

(52) U.S. Cl.
CPC ...... *G06F 13/1621* (2013.01); *G06F 13/1689* (2013.01); *G06F 13/4068* (2013.01)

(58) Field of Classification Search
CPC .............. G06F 13/1621; G06F 13/4068; G06F 13/1689
See application file for complete search history.

(56) References Cited

U.S. PATENT DOCUMENTS 11,301,408 B1 * 4/2022 Friedman ............ G06F 13/4072
2017/0075611 A1 * 3/2017 Choi ...................... G06F 3/0634

* cited by examiner

*Primary Examiner* — David E Martinez
(74) *Attorney, Agent, or Firm* — Colby Nipper PLLC

(57) ABSTRACT

Apparatuses and techniques for implementing an asymmetric read-write sequence for interconnected dies are described. The asymmetric read-write sequence refers to an asymmetric die-access sequence for read versus write operations. The "asymmetric" term refers to a difference in an order in which data is written to or read from interface and linked dies of the interconnected die architecture. The orders for the read and write operations can be chosen such that a delay associated with transferring data between the interconnected dies occurs as data passes between the interface die and a memory controller. With asymmetric read-write burst sequences, overall timing of the read and write operations of a memory device may be impacted less, if at all, by a timing delay associated with the interconnected die architecture.

20 Claims, 10 Drawing Sheets

ASYMMETRIC READ-WRITE SEQUENCE FOR INTERCONNECTED DIES

BACKGROUND

A processor executes code based on data to run applications and provide features to a user. The processor obtains the code and the data from a memory that can store information. Thus, like a processor's speed or number of cores, a memory's characteristics can impact the performance of an electronic device. Different types of memory have different characteristics. Memory types include volatile memory and nonvolatile memory, such as random access memory (RAM) and flash memory, respectively. RAM can include static RAM (SRAM) and dynamic RAM (DRAM).

Demands on the different types of memory continue to evolve and grow. For example, as processors are engineered to execute code faster, such processors can benefit from accessing memories more quickly. Applications may also operate on ever-larger data sets that use ever-larger memories. Due to battery-powered electronic devices and power-hungry data centers, energy-usage constraints are becoming more prevalent for memory systems. Further, manufacturers may seek smaller memories as the form factors of portable electronic device continue to shrink. Accommodating these various demands is thus complicated by the diverse strengths and capabilities of different types of memories.

BRIEF DESCRIPTION OF THE DRAWINGS

Apparatuses of and techniques for using an asymmetric read-write sequence for interconnected dies are described with reference to the following drawings. The same numbers are used throughout the drawings to reference like features and components.

DETAILED DESCRIPTION

Overview

Figure 1:
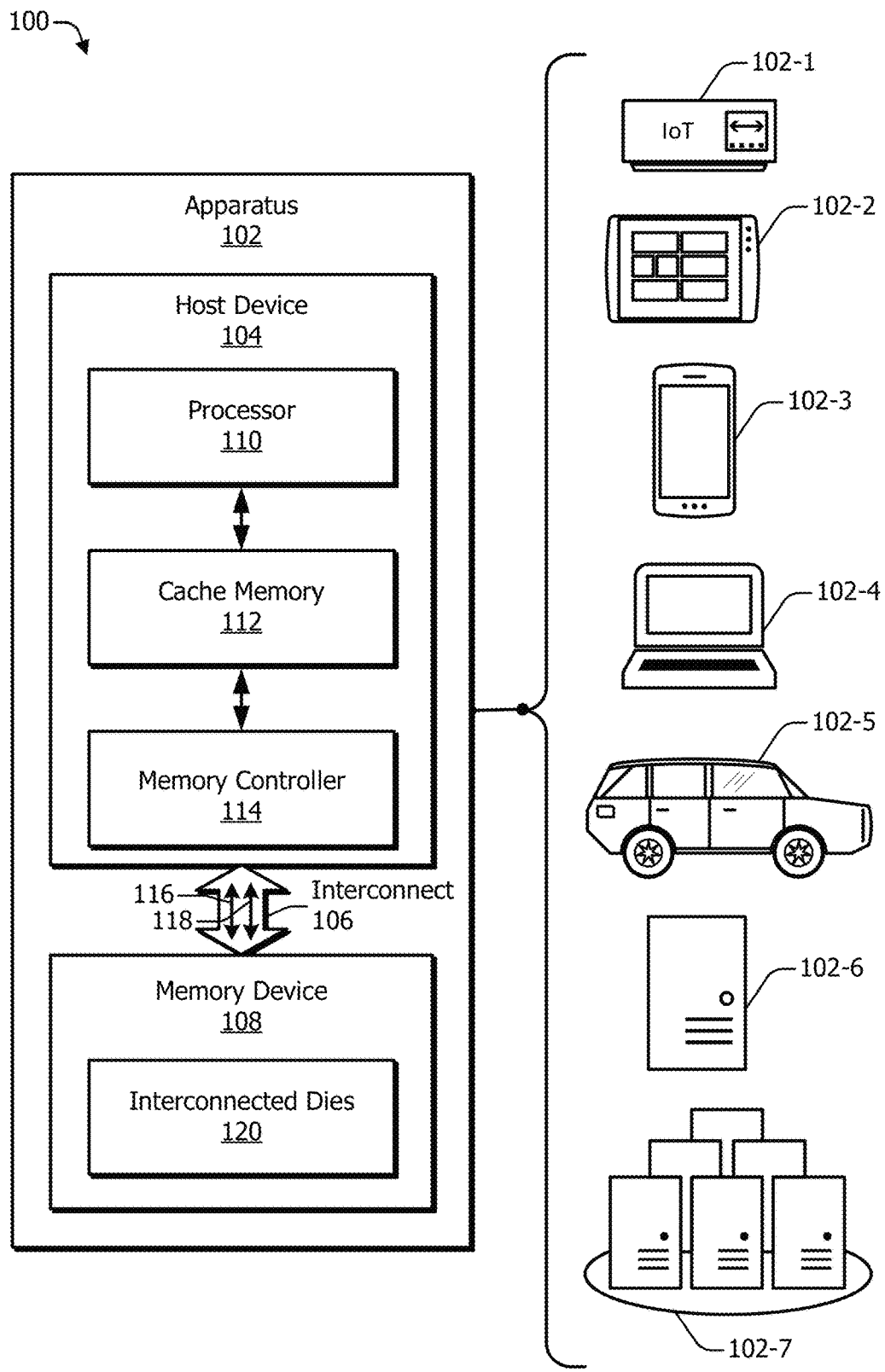
FIG. 1 illustrates an example operating environment including apparatuses that can implement an asymmetric read-write sequence for interconnected dies.

Computers, smartphones, and other electronic devices operate using processors and memories to run a variety of programs and applications, ranging from low-power operating systems and background utilities to computationally intensive applications for high-resolution graphics, computer simulations, artificial intelligence (AI), and so forth. Execution speeds associated with these programs and applications are often related to the performance of a memory of the electronic device, which is contingent, in part, on any delays associated with memory transfer.

A memory device may have an interconnected die architecture (e.g., a stacked or linked die architecture). This architecture uses at least one set of interconnected dies (or at least one set of interconnected dice), such as at least one interface die that is connected to at least one linked die within a combined package. The interface die can directly send data to or receive data from a memory controller. In contrast, the linked die indirectly sends data to or receives data from the memory controller through the interface die. Explained another way, the interface die acts as an interface and passes data between the linked die and the memory controller. The interface and linked dies may share joint access to an address bus. The interconnected die architecture can be relatively lower cost and/or occupy a smaller volume compared to other architectures with multiple dies. However, the interconnected die architecture can experience additional timing penalties associated with transferring data between the interface die and the linked die. Sometimes this timing penalty or timing delay can increase a time it takes the memory device to perform read or write operations.

To address this and other issues regarding an interconnected die architecture, this document describes aspects of an asymmetric-die-access sequence for read versus write operations. The "asymmetric" term refers to a difference in an order in which data is written to or read from the interface and linked dies of the interconnected die architecture. The orders for the read and write operations are chosen such that a delay associated with transferring data between the interconnected dies occurs as data passes between the interface die and a memory controller. With asymmetric read-write burst sequences, overall timing of the read and write operations of a memory device are impacted less, if at all, by a timing delay associated with the interconnected die architecture.

In some cases, the apparatuses and methods that are described herein may be appropriate for memory that is designed for lower power operations or that is targeted for energy-efficient applications. Thus, the described principles may be incorporated into a low-power memory device or a memory controller that communicates with such a low-power memory device. An example of a memory standard that relates to low-power applications is the Low-Power Double Data Rate (LPDDR) standard for synchronous DRAM (SDRAM) as promulgated by the Joint Electron Device Engineering Council (JEDEC) Solid State Technology Association. Some terminology in this document may draw from one or more of these standards or versions thereof, like the LPDDR5 standard, for clarity. The described principles, however, are also applicable to memories that comport with other standards, including other LPDDR standards (e.g., earlier versions or future versions like LPDDR6), and to memories that do not adhere to a public standard.

The density of memory devices continues to increase to maximize available memory and circuit area because improved communication protocols allow for higher rates of data transfer between processors and memory devices. An example of such an improved protocol is the Compute Express Link™ (CXL™) protocol or standard (referred to hereinafter as "the CXL protocol" or "the CXL standard"). The CXL protocol can be implemented over a physical layer that is governed by, for instance, the PCIe® (Peripheral Component Interconnect Express) protocol. The CXL protocol targets intensive workloads for processors and memory devices (e.g., accelerators, memory expanders), where efficient, coherent memory access or interactions between processors and memory is advantageous.

The CXL protocol addresses some of the limitations of PCIe links by providing an interface that leverages, for example, the PCIe 5.0 physical layer and electricals, while providing lower-latency paths for memory access and coherent caching between processors and memory devices. It offers high-bandwidth, low-latency connectivity between host devices (e.g., processors, CPUs, SoCs) and memory devices (e.g., accelerators, memory expanders, memory buffers, smart input/output (I/O) devices). The CXL protocol also addresses growing high-performance computational workloads by supporting heterogeneous processing and memory systems with potential applications in artificial intelligence, machine learning, communication systems, and other high-performance computing.

An asymmetric read-write sequence may be used in CXL implementations. An example implementation, for instance, can include a memory device with multiple memory controllers and/or one or more sets of interconnected dies. Each set of interconnected dies includes at least one interface die that is connected to at least one linked die via an interconnect. The interface die can directly send data to or receive data from a memory controller. In contrast, the linked die indirectly sends data to or receives data from the memory controller through the interface die and the interconnect. Explained another way, the interface die acts as an interface and passes data between the linked die and the memory controller.

There can be additional timing delays associated with transferring data between the linked die and the memory controller. For example, writing data to or reading data from the linked die incurs a timing delay associated with transferring data across the interconnect between the interconnected dies. During write operations, a timing delay occurs as data is transferred from the interface die to the linked die. During read operations, a timing delay occurs as data is transferred from the linked die to the interface die.

The asymmetric read-write sequence, however, can mask these timing delays by performing write and read operations according to different sequences. A first sequence for write operations, for instance, causes a first chunk of a burst of write data to be written to the linked die, and causes a second chunk of the burst of write data to be written to the interface die. As such, the first sequence enables at least part of a timing delay associated with the transfer of the first chunk from the interface die to the linked die to occur during at least a portion of time that the interface die receives the second chunk from the memory controller.

A second sequence for read operations is different than the first sequence for write operations. The second sequence, for instance, causes a first chunk of a burst of read data to be read from the interface die, and causes a second chunk of the burst read data to be read from the linked die. As such, the second sequence enables at least part of a timing delay associated with the transfer of the second chunk from the linked die to the interface die to occur during at least a portion of time that the interface die transmits the first chunk of read data to the memory controller.

In aspects, an asymmetric read-write sequence may be used in situations where high-density memory is used, for example in CXL implementations. However, the asymmetric read-write sequence may be implemented in various other types of memory devices with interconnected dies to ensure overall timing of the read and write operations of a memory device are impacted less, if at all, by a timing delay associated with the interconnected die architecture.

Example Operating Environments

FIG. 1 illustrates, at 100 generally, an example operating environment including an apparatus 102 that can implement an asymmetric read-write sequence for interconnected dies. The apparatus 102 can include various types of electronic devices, including an internet-of-things (IoT) device 102-1, tablet device 102-2, smartphone 102-3, notebook computer 102-4, passenger vehicle 102-5, server computer 102-6, and server cluster 102-7 that may be part of cloud computing infrastructure, a data center, or a portion thereof (e.g., a PCB). Other examples of the apparatus 102 include a wearable device (e.g., a smartwatch or intelligent glasses), entertainment device (e.g., a set-top box, video dongle, smart television, a gaming device), desktop computer, motherboard, server blade, consumer appliance, vehicle, drone, industrial equipment, security device, sensor, or the electronic components thereof. Each type of apparatus can include one or more components to provide computing functionalities or features.

In example implementations, the apparatus 102 can include at least one host device 104, at least one interconnect 106, and at least one memory device 108. The host device 104 can include at least one processor 110, at least one cache memory 112, and a memory controller 114. The memory device 108, which can also be realized with a memory module, can include, for example, a dynamic random-access memory (DRAM) die or module (e.g., Low-Power Double Data Rate synchronous DRAM (LPDDR SDRAM)). The DRAM die or module can include a three-dimensional (3D) stacked DRAM device, which may be a high-bandwidth memory (HBM) device or a hybrid memory cube (HMC) device. The memory device 108 can operate as a main memory for the apparatus 102. Although not illustrated, the apparatus 102 can also include storage memory. The storage memory can include, for example, a storage-class memory device (e.g., a flash memory, hard disk drive, solid-state drive, phase-change memory (PCM), or memory employing 3D XPoint™).

The processor 110 is operatively coupled to the cache memory 112, which is operatively coupled to the memory controller 114. The processor 110 is also coupled, directly or indirectly, to the memory controller 114. The host device 104 may include other components to form, for instance, a system-on-a-chip (SoC). The processor 110 may include a general-purpose processor, central processing unit (CPU), graphics processing unit (GPU), neural network engine or accelerator, application-specific integrated circuit (ASIC), field-programmable gate array (FPGA) integrated circuit (IC), or communications processor (e.g., a modem or baseband processor).

In operation, the memory controller 114 can provide a high-level or logical interface between the processor 110 and at least one memory (e.g., an external memory). The memory controller 114 may be realized with any of a variety of suitable memory controllers (e.g., a DDR memory controller that can process requests for data stored on the memory device 108). Although not shown, the host device 104 may include a physical interface (PHY) that transfers data between the memory controller 114 and the memory device 108 through the interconnect 106. For example, the physical interface may be an interface that is compatible with a DDR PHY Interface (DFI) Group interface protocol. The memory controller 114 can, for example, receive memory requests from the processor 110 and provide the memory requests to external memory with appropriate formatting, timing, and reordering. The memory controller 114 can also forward to the processor 110 responses to the memory requests received from external memory.

The host device 104 is operatively coupled, via the interconnect 106, to the memory device 108. In some examples, the memory device 108 is connected to the host device 104 via the interconnect 106 with an intervening buffer or cache. The memory device 108 may operatively couple to storage memory (not shown). The host device 104 can also be coupled, directly or indirectly via the interconnect 106, to the memory device 108 and the storage memory. The interconnect 106 and other interconnects (not illustrated in FIG. 1) can transfer data between two or more components of the apparatus 102. Examples of the interconnect 106 include a bus, switching fabric, or one or more wires that carry voltage or current signals.

In some implementations, the interconnect 106 can include at least one command and address bus 116 (CA bus 116) and at least one data bus 118 (DQ bus 118). Each bus may be a unidirectional or a bidirectional bus. The CA bus 116 and the DQ bus 118 may couple to CA and DQ pins, respectively, of the memory device 108. The interconnect 106 may also include a chip-select (CS) I/O or line (not illustrated in FIG. 1) that can, for example, couple to one or more CS pins of the memory device 108. The interconnect 106 may further include a clock bus (CK bus—not illustrated in FIG. 1) that is part of or separate from the CA bus 122.

In other implementations, the interconnect 106 can be realized as a CXL link. In other words, the interconnect 106 can comport with at least one CXL standard or protocol. The CXL link can provide an interface on top of the physical layer and electricals of a PCIe 5.0 physical layer. The CXL link can cause requests to and responses from the memory device 108 to be packaged as flits. An example implementation of the apparatus 102 with a CXL link is discussed in greater detail with respect to FIG. 4. In still other implementations, the interconnect 106 can be another type of link, including a PCIe 5.0 link. In this document, some terminology may draw from one or more of these standards or versions thereof, like the CXL standard, for clarity. The described principles, however, are also applicable to memories and systems that comport with other standards and types of interconnects.

The illustrated components of the apparatus 102 represent an example architecture with a hierarchical memory system. A hierarchical memory system may include memories at different levels, with each level having memory with a different speed or capacity. As illustrated, the cache memory 112 logically couples the processor 110 to the memory device 108. In the illustrated implementation, the cache memory 112 is at a higher level than the memory device 108. A storage memory, in turn, can be at a lower level than the main memory (e.g., the memory device 108). Memory at lower hierarchical levels may have a decreased speed but increased capacity relative to memory at higher hierarchical levels.

The apparatus 102 can be implemented in various manners with more, fewer, or different components. For example, the host device 104 may include multiple cache memories (e.g., including multiple levels of cache memory) or no cache memory. In other implementations, the host device 104 may omit the processor 110 or the memory controller 114. A memory (e.g., the memory device 108) may have an "internal" or "local" cache memory. As another example, the apparatus 102 may include cache memory between the interconnect 106 and the memory device 108. Computer engineers can also include any of the illustrated components in distributed or shared memory systems.

Computer engineers may implement the host device 104 and the various memories in multiple manners. In some cases, the host device 104 and the memory device 108 can be disposed on, or physically supported by, a PCB (e.g., a rigid or flexible motherboard). The host device 104 and the memory device 108 may additionally be integrated together on an IC or fabricated on separate ICs and packaged together. The memory device 108 may also be coupled to multiple host devices 104 via one or more interconnects 106 and may respond to memory requests from two or more host devices 104. Each host device 104 may include a respective memory controller 114, or the multiple host devices 104 may share a memory controller 114. This document describes with reference to FIG. 2 an example computing system architecture having at least one host device 104 coupled to a memory device 108.

Two or more memory components (e.g., modules, dies, banks, or bank groups) can share the electrical paths or couplings of the interconnect 106. In some implementations, the CA bus 116 transmits addresses and commands from the memory controller 114 of the host device 104 to the memory device 108, which may exclude propagation of data. The DQ bus 118 can propagate data between the memory controller 114 and the memory device 108. The memory device 108 may also be implemented as any suitable memory including, but not limited to, DRAM, SDRAM, three-dimensional (3D) stacked DRAM, DDR memory, or LPDDR memory (e.g., LPDDR DRAM or LPDDR SDRAM).

The memory device 108 can form at least part of the main memory of the apparatus 102. The memory device 108 may, however, form at least part of a cache memory, a storage memory, or an SoC of the apparatus 102. In some implementations, and as discussed in greater detail with respect to FIG. 3, at least a portion of the memory device 108 has an interconnected die architecture (e.g., a stacked die architecture or linked die architecture) with at least two interconnected dies 120. The interconnected die architecture enables the memory device 108 to use two or more interconnected dies 120 for a single write or read access along a shared data path, which can be controlled or managed by a die of the interconnected dies 120.

The interconnected dies 120 operate jointly to handle write and read requests issued by the memory controller 114 or another memory controller within the memory device 108, depending on implementation. The interconnected dies 120 are further described with respect to FIGS. 5 and 6.

Figure 2:
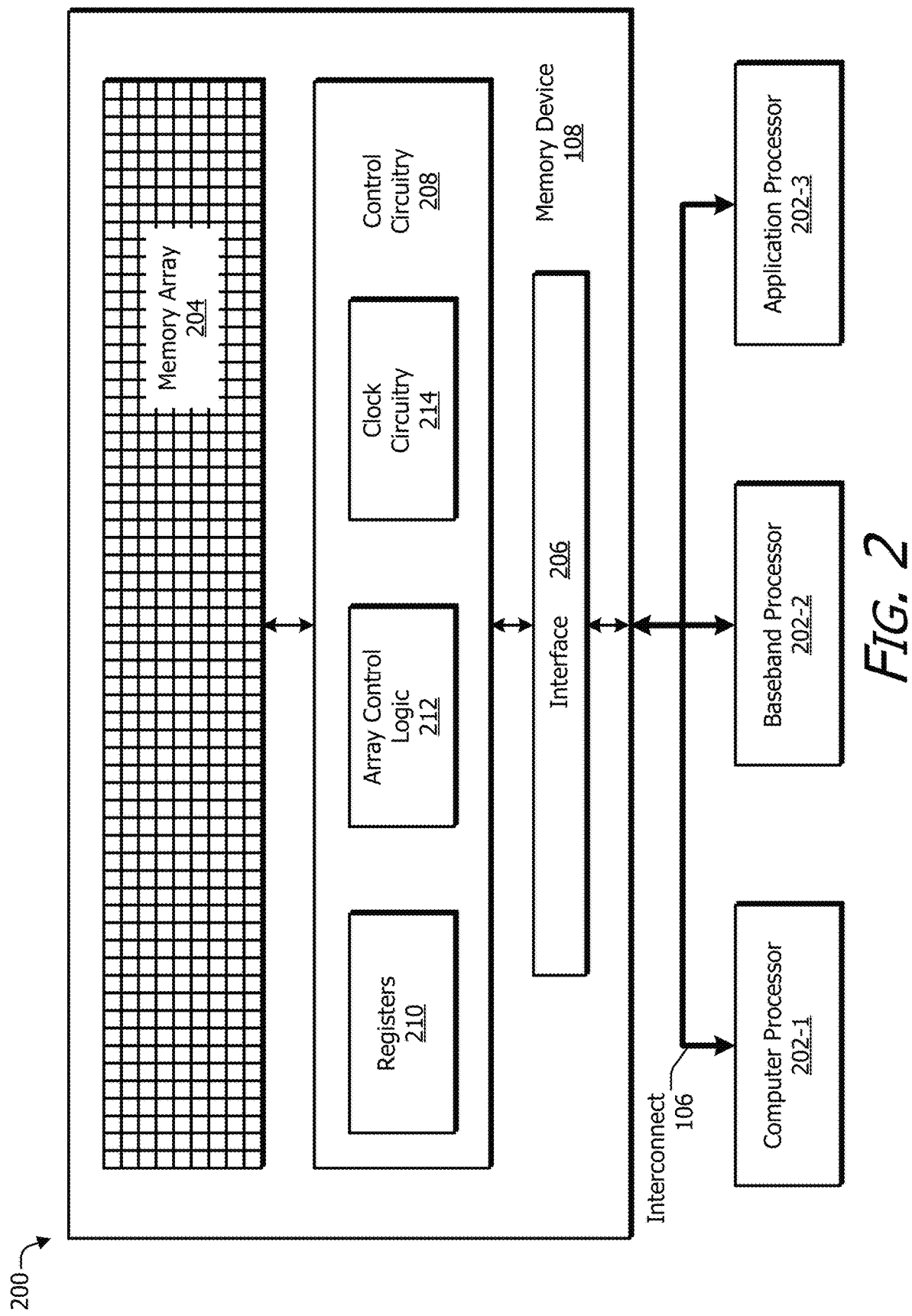
FIG. 2 illustrates an example computing system that can implement an asymmetric read-write sequence for interconnected dies.

FIG. 2 illustrates an example computing system 200 that can implement aspects of an asymmetric read-write sequence for interconnected dies 120. In some implementations, the computing system 200 includes at least one memory device 108, at least one interconnect 106, and at least one processor 202.

The memory device 108 can include, or be associated with, at least one memory array 204, at least one interface 206, and control circuitry 208 operatively coupled to the memory array 204. The memory device 108 can correspond to one or more of the cache memory, the main memory, or a storage memory of the apparatus 102 of FIG. 1. Thus, the memory array 204 can include an array of memory cells, including but not limited to memory cells of DRAM, SDRAM, 3D-stacked DRAM, DDR memory, low-power DRAM, or LPDDR SDRAM. For example, the memory array 204 can include memory cells of SDRAM configured as a memory module with one channel containing either 16 or 8 data (DQ) signals, double-data-rate input/output (I/O) signaling, and supporting a supply voltage of 0.3 to 0.5V. The density of the memory device 108 can range, for instance, from 2 Gb to 32 Gb.

The memory array 204 and the control circuitry 208 may be components on a single semiconductor die or on separate semiconductor dies. The memory array 204 or the control circuitry 208 may also be distributed across multiple dies, such as the interconnected dies 120. Although not explicitly shown in FIG. 2, the control circuitry 208 may include circuitry enabling one interconnected die to communicate with another interconnected die. This control circuitry may manage traffic on a bus that is separate from the interconnect 106.

The control circuitry 208 can include various components that the memory device 108 can use to perform various operations. These operations can include communicating with other devices, managing memory performance, performing refresh operations (e.g., self-refresh operations or auto-refresh operations), and performing memory read or write operations. For example, the control circuitry 208 can include one or more registers 210, at least one instance of array control logic 212, and clock circuitry 214. The registers 210 may be implemented, for example, as one or more registers that can store information to be used by the control circuitry 208 or another part of the memory device 108. The array control logic 212 can include circuitry that provides command decoding, address decoding, input/output functions, amplification circuitry, power supply management, power control modes, and other functions. The clock circuitry 214 can synchronize various memory components with one or more external clock signals provided over the interconnect 106, including a command/address clock or a data clock. The clock circuitry 214 can also use an internal clock signal to synchronize memory components and may provide timer functionality.

The interface 206 can couple the control circuitry 208 or the memory array 204 directly or indirectly to the interconnect 106. As shown in FIG. 2, the registers 210, the array control logic 212, and the clock circuitry 214 can be part of a single component (e.g., the control circuitry 208). In other implementations, one or more of the registers 210, the array control logic 212, or the clock circuitry 214 may be separate components on a single semiconductor die or distributed across multiple semiconductor dies. These components may individually or jointly couple to the interconnect 106 via the interface 206.

The interconnect 106 may use one or more of a variety of interconnects that communicatively couple together various components and enable commands, addresses, or other information and data to be transferred between two or more components (e.g., between the memory device 108 and the processor 202). Although the interconnect 106 is illustrated with a single line in FIG. 2, the interconnect 106 may include at least one bus, at least one switching fabric, one or more wires or traces that carry voltage or current signals, at least one switch, one or more buffers, and so forth. Further, the interconnect 106 may be separated into at least a CA bus 116 and a DQ bus 118 (as illustrated in FIG. 1). As discussed above with respect to FIG. 1, the interconnect 106 can include a CXL link or comport with at least one CXL standard. The CXL link can provide an interface or overlay on top of the physical layer and electricals of the PCIe 5.0 physical layer.

In some aspects, the memory device 108 may be a "separate" component relative to the host device 104 (of FIG. 1) or any of the processors 202. The separate components can include a PCB, memory card, memory stick, and memory module (e.g., a single in-line memory module (SIMM) or dual in-line memory module (DIMM)). Thus, separate physical components may be located together within the same housing of an electronic device or may be distributed over a server rack, a data center, and so forth. Alternatively, the memory device 108 may be integrated with other physical components, including the host device 104 or the processor 202, by being combined on a PCB or in a single package or an SoC.

As shown in FIG. 2, the processors 202 may include a computer processor 202-1, a baseband processor 202-2, and an application processor 202-3, coupled to the memory device 108 through the interconnect 106. The processors 202 may include or form a part of a CPU, GPU, SoC, ASIC, or FPGA. In some cases, a single processor can comprise multiple processing resources, each dedicated to different functions (e.g., modem management, applications, graphics, central processing). In some implementations, the baseband processor 202-2 may include or be coupled to a modem (not illustrated in FIG. 2) and referred to as a modem processor. The modem or the baseband processor 202-2 may be coupled wirelessly to a network via, for example, cellular, WiFi®, Bluetooth®, near field, or another technology or protocol for wireless communication.

In some implementations, the processors 202 may be connected directly to the memory device 108 (e.g., via the interconnect 106). In other implementations, one or more of the processors 202 may be indirectly connected to the memory device 108 (e.g., over a network connection or through one or more other devices). Further, the processor 202 may be realized as one that can communicate over a CXL-compatible interconnect. Accordingly, a respective processor 202 can include or be associated with a respective link controller, like the link controller 402 illustrated in FIG. 4. Alternatively, two or more processors 202 may access the memory device 108 using a shared link controller 402. In some of such cases, the memory device 108 may be implemented as a CXL-compatible memory device (e.g., as a CXL Type 3 memory expander) or another memory device that is compatible with a CXL protocol may also or instead be coupled to the interconnect 106.

Example Techniques and Hardware

Figure 3:
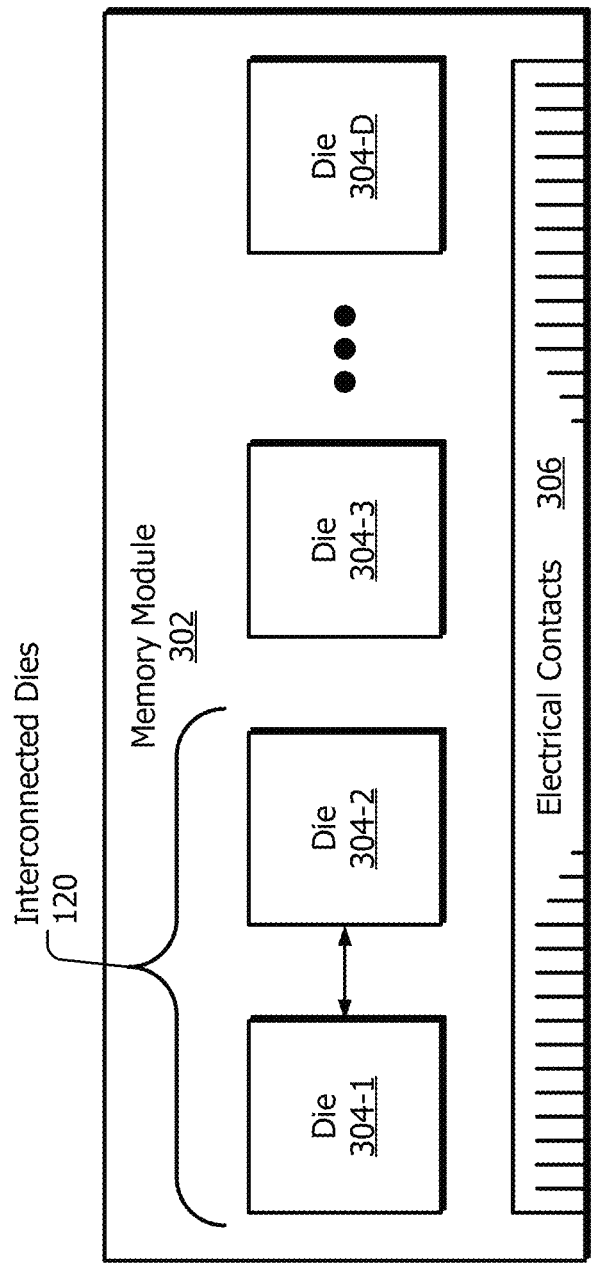
FIG. 3 illustrates an example memory device in which an asymmetric read-write sequence for interconnected dies can be implemented.

FIG. 3 illustrates an example memory device 108 in which an asymmetric read-write sequence for interconnected dies can be implemented. An example memory module 302 includes multiple dies 304. As illustrated, the memory module 302 includes a first die 304-1, a second die 304-2, a third die 304-3, and a Dth die 304-D, with D representing a positive integer. Two or more of the dies 304-1 to 304-D can be implemented as interconnected dies 120. For example, the dies 304-1 and 304-2 can be interconnected dies 120. In some cases, the memory module 302 includes multiple sets of interconnected dies 120, such as multiple pairs of interconnected dies, or includes a set of interconnected dies 120 that has four or more dies.

As a few examples, the memory module 302 can be a SIMM or a DIMM. As another example, the memory module 302 can interface with other components via a bus interconnect (e.g., a Peripheral Component Interconnect Express (PCIe®) bus). The memory device 108 illustrated in FIGS. 1 and 2 can correspond, for example, to multiple dies (or dice) 304-1 through 304-D, or a memory module 302 with two or more dies 304. As shown, the memory module 302 can include one or more electrical contacts 306 (e.g., pins) to interface the memory module 302 to other components.

The memory module 302 can be implemented in various manners. For example, the memory module 302 may include a PCB, and the multiple dies 304-1 through 304-D may be mounted or otherwise attached to the PCB. The dies 304 (e.g., memory dies) may be arranged in a line or along two or more dimensions (e.g., forming a grid or array). The dies 304 may have a similar size or may have different sizes. Each die 304 may be similar to another die 304 or different in size, shape, data capacity, or control circuitries. The dies 304 may also be positioned on a single side or on multiple sides of the memory module 302. In some cases, the memory module 302 may be part of a CXL memory system or module.

Figure 4:
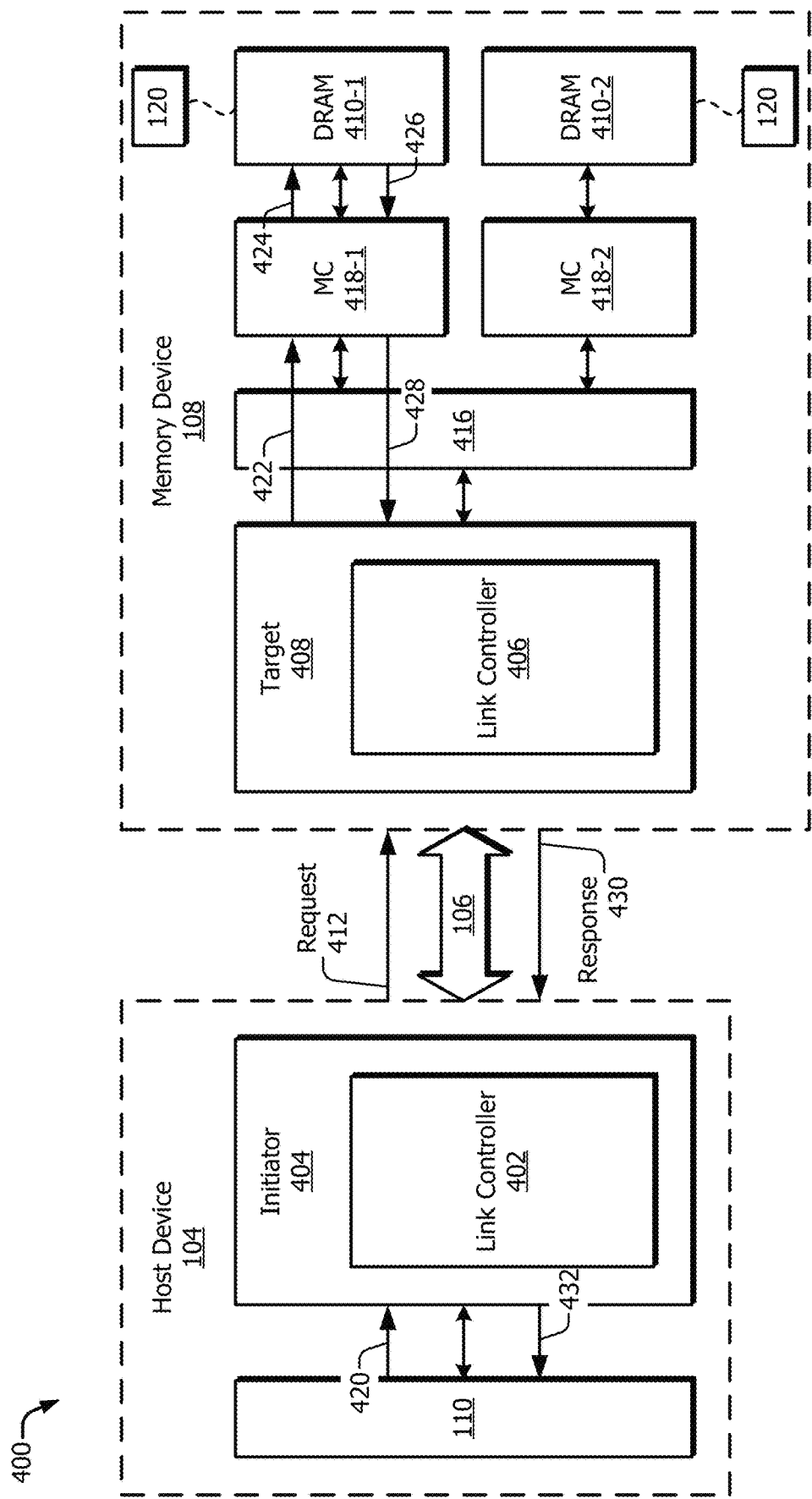
FIG. 4 illustrates an example of a system that includes a host device and a memory device coupled together via an interconnect in which an asymmetric read-write sequence for interconnected dies may be implemented within the memory device.

FIG. 4 illustrates an example of a system 400 that includes a host device 104 and a memory device 108 that are coupled together via an interconnect 106. The system 400 may form at least part of an apparatus 102 as shown in FIG. 1. As illustrated, the host device 104 includes a processor 110 and a link controller 402, which can be realized with at least one initiator 404. Thus, the initiator 404 can be coupled to the processor 110 or to the interconnect 106 (including to both), and the initiator 404 can be coupled between the processor 110 and the interconnect 106. Examples of initiators 404 may include a leader, a primary, a master, a main component, and so forth.

In the illustrated example system 400, the memory device 108 includes a link controller 406, which may be realized with at least one target 408. The target 408 can be coupled to the interconnect 106. Thus, the target 408 and the initiator 404 can be coupled to each other via the interconnect 106. Example targets 408 may include a follower, a secondary, a slave, a responding component, and so forth. The memory device 108 also includes a memory, which may be realized with at least one memory module 302 or other component, such as a DRAM 410, as is described further below.

In example implementations, the initiator 404 includes the link controller 402, and the target 408 includes the link controller 406. The link controller 402 or the link controller 406 can instigate, coordinate, cause, or otherwise control signaling across a physical or logical link realized by the interconnect 106 in accordance with one or more protocols. The link controller 402 may be coupled to the interconnect 106. The link controller 406 may also be coupled to the interconnect 106. Thus, the link controller 402 can be coupled to the link controller 406 via the interconnect 106. Each link controller 402 or 406 may, for instance, control communications over the interconnect 106 at a link layer or at one or more other layers of a given protocol. Communication signaling may include, for example, a request 412 (e.g., a write request or a read request), a response 414 (e.g., a write response or a read response), and so forth.

The memory device 108 may further include at least one interconnect 416 and at least one memory controller 418 (e.g., MC 418-1 and MC 418-2). Within the memory device 108, and relative to the target 408, the interconnect 416, the memory controller 418, and/or the DRAM 410 (or other memory component) may be referred to as a "backend" component of the memory device 108. In some cases, the interconnect 416 is internal to the memory device 108 and may operate in a manner the same as or different from the interconnect 106.

As shown, the memory device 108 may include multiple memory controllers 418-1 and 418-2 and/or multiple DRAMs 410-1 and 410-2. Although two each are shown, the memory device 108 may include one or more memory controllers 418 and/or one or more DRAMs 410. For example, a memory device 108 may include four memory controllers 418 and sixteen DRAMs 410, such as four DRAMs 410 per memory controller 418. The memory components of the memory device 108 are depicted as DRAM 410 only as an example, for one or more of the memory components may be implemented as another type of memory. For instance, the memory components may include nonvolatile memory like flash or PCM. Alternatively, the memory components may include other types of volatile memory like static random-access memory (SRAM). A memory device 108 may also include any combination of memory types. In example implementations, the DRAM 410-1 and/or the DRAM 410-2 include interconnected dies 120.

In some cases, the memory device 108 may include the target 408, the interconnect 416, the at least one memory controller 418, and the at least one DRAM 410 within a single housing or other enclosure. The enclosure, however, may be omitted or may be merged with an enclosure for the host device 104, the system 400, or an apparatus 102 (of FIG. 1). The interconnect 416 can be disposed on a PCB. Each of the target 408, the memory controller 418, and the DRAM 410 may be fabricated on at least one IC and packaged together or separately. The packaged ICs may be secured to or otherwise supported by the PCB and may be directly or indirectly coupled to the interconnect 416. In other cases, the target 408, the interconnect 416, and the one or more memory controllers 418 may be integrated together into one IC. In some of such cases, this IC may be coupled to a PCB, and one or more modules for the memory components (e.g., for the DRAM 410) may also be coupled to the same PCB, which can form a CXL type of memory device 108. This memory device 108 may be enclosed within a housing or may include such a housing. The components of the memory device 108 may, however, be fabricated, packaged, combined, and/or housed in other manners.

As illustrated in FIG. 4, the target 408, including the link controller 406 thereof, can be coupled to the interconnect 416. Each memory controller 418 of the multiple memory controllers 418-1 and 418-2 can also be coupled to the interconnect 416. Accordingly, the target 408 and each memory controller 418 of the multiple memory controllers 418-1 and 418-2 can communicate with each other via the interconnect 416. Each memory controller 418 is coupled to at least one DRAM 410. As shown, each respective memory controller 418 of the multiple memory controllers 418-1 and 418-2 is coupled to at least one respective DRAM 410 of the multiple DRAMs 410-1 and 410-2. Each memory controller 418 of the multiple memory controllers 418-1 and 418-2 may, however, be coupled to a respective set of multiple DRAMs 410 (e.g., five DRAMs 410) or other memory components.

Each memory controller 418 can access at least one DRAM 410 by implementing one or more memory access protocols to facilitate reading or writing data based on at least one memory address. The memory controller 418 can increase bandwidth or reduce latency for the memory accessing based on the memory type or organization of the memory components, like the DRAMs 410. The multiple memory controllers 418-1 and 418-2 and the multiple DRAMs 410-1 and 410-2 can be organized in many different manners. For example, each memory controller 418 can realize one or more memory channels for accessing the DRAMs 410. Further, the DRAMs 410 can be manufactured to include one or more ranks, such as a single-rank or a dual-rank memory module. Each DRAM 410 (e.g., at least one DRAM IC chip) may also include multiple banks, such as 8 or 16 banks.

This document now describes examples of the host device 104 accessing the memory device 108. The examples are described in terms of a general access which may include a memory read access (e.g., a retrieval operation) or a memory write access (e.g., a storage operation). The processor 110 can provide a memory access request 420 to the initiator 404. The memory access request 420 may be propagated over a bus or other interconnect that is internal to the host device 104. This memory access request 420 may be or may include a read request or a write request. The initiator 404, such as the link controller 402 thereof, can reformulate the memory access request 420 into a format that is suitable for the interconnect 106. This formulation may be performed based on a physical protocol or a logical protocol (including both) applicable to the interconnect 106. Examples of such protocols are described below.

The initiator 404 can thus prepare a request 412 and transmit the request 412 over the interconnect 106 to the target 408. The target 408 receives the request 412 from the initiator 404 via the interconnect 106. The target 408, including the link controller 406 thereof, can process the request 412 to determine (e.g., extract or decode) the memory access request 420. Based on the determined memory access request 420, the target 408 can forward a memory request 422 over the interconnect 416 to a memory controller 418, which is the first memory controller 418-1 in this example. For other memory accesses, the targeted data may be accessed with the second DRAM 410-2 through the second memory controller 418-2.

The first memory controller 418-1 can prepare a memory command 424 based on the memory request 422. The first memory controller 418-1 can provide the memory command 424 to the first DRAM 410-1 over an interface or interconnect appropriate for the type of DRAM or other memory component. The first DRAM 410-1 receives the memory command 424 from the first memory controller 418-1 and can perform the corresponding memory operation. The memory command 424, and corresponding memory operation, may pertain to a read operation, a write operation, a refresh operation, and so forth. Based on the results of the memory operation, the first DRAM 410-1 can generate a memory response 426. If the memory request 422 is for a read operation, the memory response 426 can include the requested data. If the memory request 422 is for a write operation, the memory response 426 can include an acknowledgment that the write operation was performed successfully. The first DRAM 410-1 can return the memory response 426 to the first memory controller 418-1.

The first memory controller 418-1 receives the memory response 426 from the first DRAM 410-1. Based on the memory response 426, the first memory controller 418-1 can prepare a memory response 428 and transmit the memory response 428 to the target 408 via the interconnect 416. The target 408 receives the memory response 428 from the first memory controller 418-1 via the interconnect 416. Based on this memory response 428, and responsive to the corresponding request 412, the target 408 can formulate a response 430 for the requested memory operation. The response 430 can include read data or a write acknowledgment and be formulated in accordance with one or more protocols of the interconnect 106.

To respond to the request 412 from the host device 104, the target 408 can transmit the response 430 to the initiator 404 over the interconnect 106. Thus, the initiator 404 receives the response 430 from the target 408 via the interconnect 106. The initiator 404 can therefore respond to the "originating" memory access request 420, which is from the processor 110 in this example. To do so, the initiator 404 prepares a memory access response 432 using the information from the response 430 and provides the memory access response 432 to the processor 110. In this way, the host device 104 can obtain memory access services from the memory device 108 using the interconnect 106. Example aspects of an interconnect 106 are described next.

The interconnect 106 can be implemented in a myriad of manners to enable memory-related communications to be exchanged between the initiator 404 and the target 408. Generally, the interconnect 106 can carry memory-related information, such as data or a memory address, between the initiator 404 and the target 408. In some cases, the initiator 404 or the target 408 (including both) can prepare memory-related information for communication across the interconnect 106 by encapsulating such information. The memory-related information can be encapsulated into, for example, at least one packet (e.g., a flit). One or more packets may include headers with information indicating or describing the content of each packet.

In example implementations, the interconnect 106 can support, enforce, or enable memory coherency for a shared memory system, for a cache memory, for combinations thereof, and so forth. Additionally or alternatively, the interconnect 106 can be operated based on a credit allocation system. Possession of a credit can enable an entity, such as the initiator 404, to transmit another memory request 412 to the target 408. The target 408 may return credits to "refill" a credit balance at the initiator 404. A credit-based communication scheme across the interconnect 106 may be implemented by credit logic of the target 408 or by credit logic of the initiator 404 (including by both working together in tandem).

The system 400, the initiator 404 of the host device 104, or the target 408 of the memory device 108 may operate or interface with the interconnect 106 in accordance with one or more physical or logical protocols. For example, the interconnect 106 may be built in accordance with a Peripheral Component Interconnect Express (PCIe or PCI-e) standard. Applicable versions of the PCIe standard may include 1.x, 2.x, 3.x, 4.0, 5.0, 6.0, and future or alternative versions. In some cases, at least one other standard is layered over the physical-oriented PCIe standard. For example, the initiator 404 or the target 408 can communicate over the interconnect 106 in accordance with a Compute Express Link (CXL) standard. Applicable versions of the CXL standard may include 1.x, 2.0, and future or alternative versions. The CXL standard may operate based on credits, such as read credits and write credits. In such implementations, the link controller 402 and the link controller 406 can be CXL controllers.

Examples of an asymmetric read-write sequence are described herein with reference to at least one memory controller 114 or 418 and at least one memory device 108 (e.g., having a memory array 204, a memory module 302, and/or a DRAM 410), including interconnected dies 120 thereof. The interconnected dies 120 are further described with respect to FIGS. 5 and 6.

Figure 5:
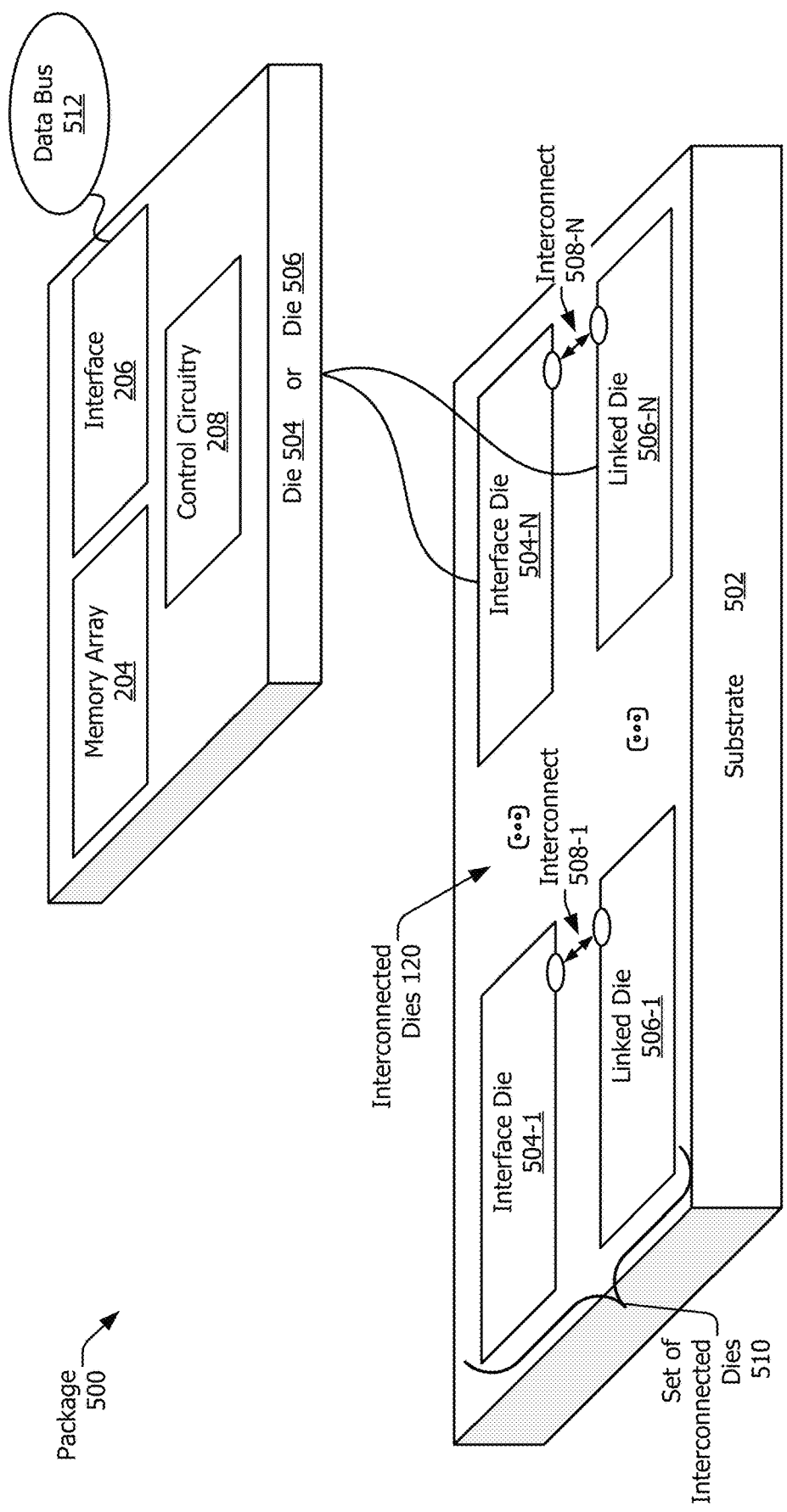
FIG. 5 illustrates an example package with interconnected dies that can implement an asymmetric read-write sequence.

FIG. 5 illustrates an example package 500 with interconnected dies 120 that can implement an asymmetric read-write sequence. Although not shown, the package 500 can also include other components, such as one or more other components of the memory device 108 and/or one or more components of the host device 104. In the depicted configuration, the package 500 includes a substrate 502. The interconnected dies 120 are disposed on or embedded in the substrate 502. The interconnected dies 120 include at least one interface die 504 and at least one linked die 506. In this example, the package 500 is shown to include interface dies 504-1 to 504-N and linked dies 506-1 to 506-N, where N represents a positive integer. Each linked die 506 is coupled to an interface die 504 via an interconnect 508. In FIG. 5, the linked dies 506-1 to 506-N are respectively coupled to the interface dies 504-1 to 504-N by the interconnects 508-1 to 508-N.

Although not explicitly shown, the interface die 504 is operatively coupled to the memory controller 114 or 418 (e.g., of FIG. 1 or 4) and acts as an interface between the linked die 506 and the memory controller 114 or 418 for at least data transfers or exchanges. Although the interface die 504 and the linked die 506 can behave differently, the interface die 504 and the linked die 506 can be manufactured as a same type of die that includes the same circuit components. Once the package 500 is assembled, each of the dies can be programmed to function as an interface die 504 or a linked die 506. As an example, the interconnected dies 120 can be programmed by setting at least one respective fuse in each die.

In example aspects, a set of interconnected dies 510 can refer to one interface die 504 and one linked die 506. However, other configurations are also possible in which an interface die 504 is operatively coupled to two or more linked dies 506. In general, the set of interconnected dies 510 refers to a group of interconnected dies 120 that are operatively coupled together. For example, the linked die 506 within the set of interconnected dies 510 is operatively coupled, via the interconnect 508, to the interface die 504 within the set of interconnected dies 510. Also, the interface die 504 within the set of interconnected dies 510 is operatively coupled, via the interconnect 508, to one or more linked dies 506 within the set of interconnected dies 510. In FIG. 5, the interface die 504-1 and the linked die 506-1 can represent a first set of interconnected dies 510, and the interface die 504-N and the linked die 506-N can represent an Nth set of interconnected dies 510.

The interconnects 508-1 to 508-N can transfer data between corresponding interface dies 504-1 to 504-N and linked dies 506-1 to 506-N, respectively. For example, the interconnect 508-1 can transfer data between the interface die 504-1 and the linked die 506-1. Likewise, the interconnect 508-N can transfer data between the interface die 504-N and the linked die 506-N. In an example implementation, the interconnects 508 support the transfer of 128 bits (e.g., 16 bytes) per access. Although the interconnects 508-1 to 508-N are illustrated with individual lines in FIG. 5, each interconnect 508 can include at least one bus, at least one switching fabric, one or more wires or traces that carry voltage or current signals, at least one switch, one or more buffers, and so forth.

The interface die 504 and/or the linked die 506 can each include at least one memory array 204, at least one interface 206, and control circuitry 208. The interface 206 can couple the control circuitry 208 or the memory array 204 directly or indirectly to the interconnect 508. The interface 206 can also include a data bus 512. Examples for the pins of the interface die 504 and the linked die 506 are further described with respect to FIG. 6.

Figure 6:
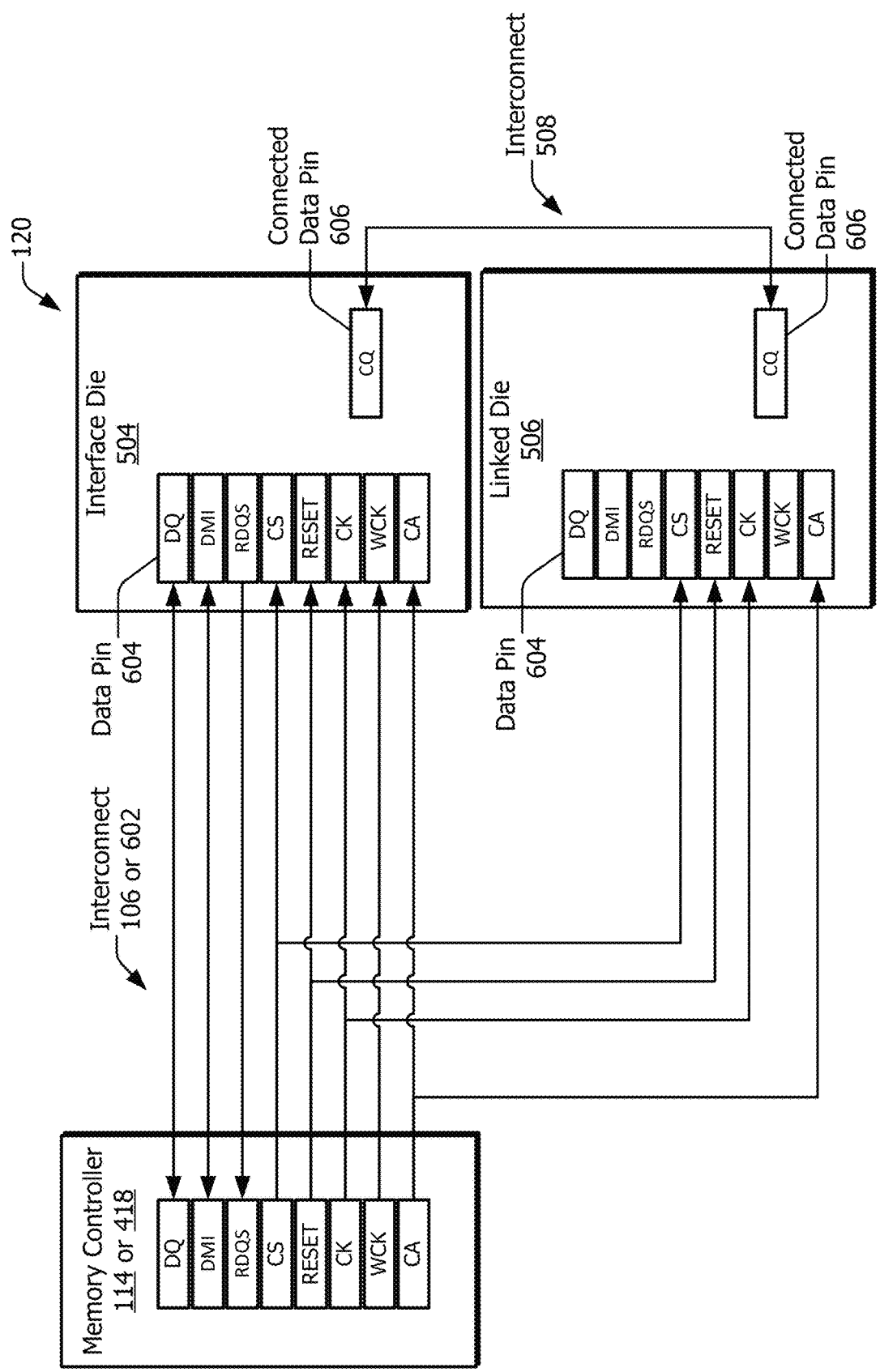
FIG. 6 illustrates example connections between a memory controller and multiple interconnected dies.

FIG. 6 illustrates example connections between the memory controller 114 or 418 and multiple interconnected dies 120 of the memory device 108. In the case of the memory controller 114, the interconnect 106 can provide multiple lines of electrical communication between the memory controller 114 and each die of the interconnected dies 120. Alternatively, in the case of the memory controller 418, an interconnect 602 can provide multiple lines of electrical communication between the memory controller 418 and each die of the interconnected dies 120. The lines of the interconnect 106 or 602 may correspond to clock (CK) lines, write clock (WCK) lines, write mask lines, command/address lines, or other memory communication lines. With the interconnect 106 or 602, the interface die 504 and the linked die 506 can receive commands from a common command and address bus.

The interface die 504 and the linked die 506 each include a data pin 604 and a connected data pin 606. The data pin 604 can represent multiple pins that enable the transfer of multiple bits per access. For example, the data pin 604 can represent eight pins. The data pin 604 may comport, at least partially, with LPDDR5, to another standard, or to no public standard. The interface die 504 and the linked die 506 differ in that the data pin 604 of the interface die 504 is active and operatively coupled to the memory controller 114 or 418. In this way, the interface die 504 can "directly" transmit data to or "directly" receive data from the memory controller 114 or 418 without using another die as an intermediary for sending data to the memory controller 114 or 418 or receiving data from the memory controller 114 or 418. In contrast, the data pin 604 of the linked die 506 is inactive and not operatively coupled to the memory controller 114 or 418. As such, the linked die 506 is unable to directly communicate with the memory controller 114 or 418. In particular, the linked die 506 is unable to directly transmit data to or directly receive data from the memory controller 114 or 418. Instead, the linked die 506 can "indirectly" communicate with the memory controller 114 or 418 via at least one other die—the interface die 504, which is described next.

The interface die 504 and the linked die 506 each include a connected data pin 606 (CQ 606). The connected data pin 606 can represent multiple pins that enable the transfer of multiple bits per access. For example, the connected data pin 606 can represent 32 pins. The interconnect 508 operatively couples the linked die 506 to the interface die 504 via the connected data pin 606 of each die. With the interconnect 508 and the connected data pins 606, the linked die 506 can transmit data to or receive data from the interface die 504. The interface die 504 can transfer data from the memory controller 114 or 118 to the linked die 506. Also, the interface die 504 can transfer data from the linked die 506 to the memory controller 114 or 118. In this way, the linked die 506 can indirectly transmit data to or indirectly receive data from the memory controller 114 or 418 through the interface die 504. Explained another way, the interface die 504 acts as an interface for the linked die 506 and passes data between the linked die 506 and the memory controller 114 or 418.

The interconnected die architecture illustrated in FIG. 6 can reduce cost and conserve space within the apparatus 102. For example, the interconnect 106 or 602 can be implemented with fewer lines of electrical communication as fewer pins on the linked die 506 may be active relative to the interface die 504. These benefits may come at the cost of a timing penalty associated with transferring data between the interface die 504 and the linked die 506 via the interconnect 508. Techniques for implementing an asymmetric read-write sequence, however, can enable overall timing of read and write operations to be impacted less, if at all, by such a timing penalty. Examples of the asymmetric read-write sequence is further described with respect to FIGS. 7 and 8.

Figure 7:
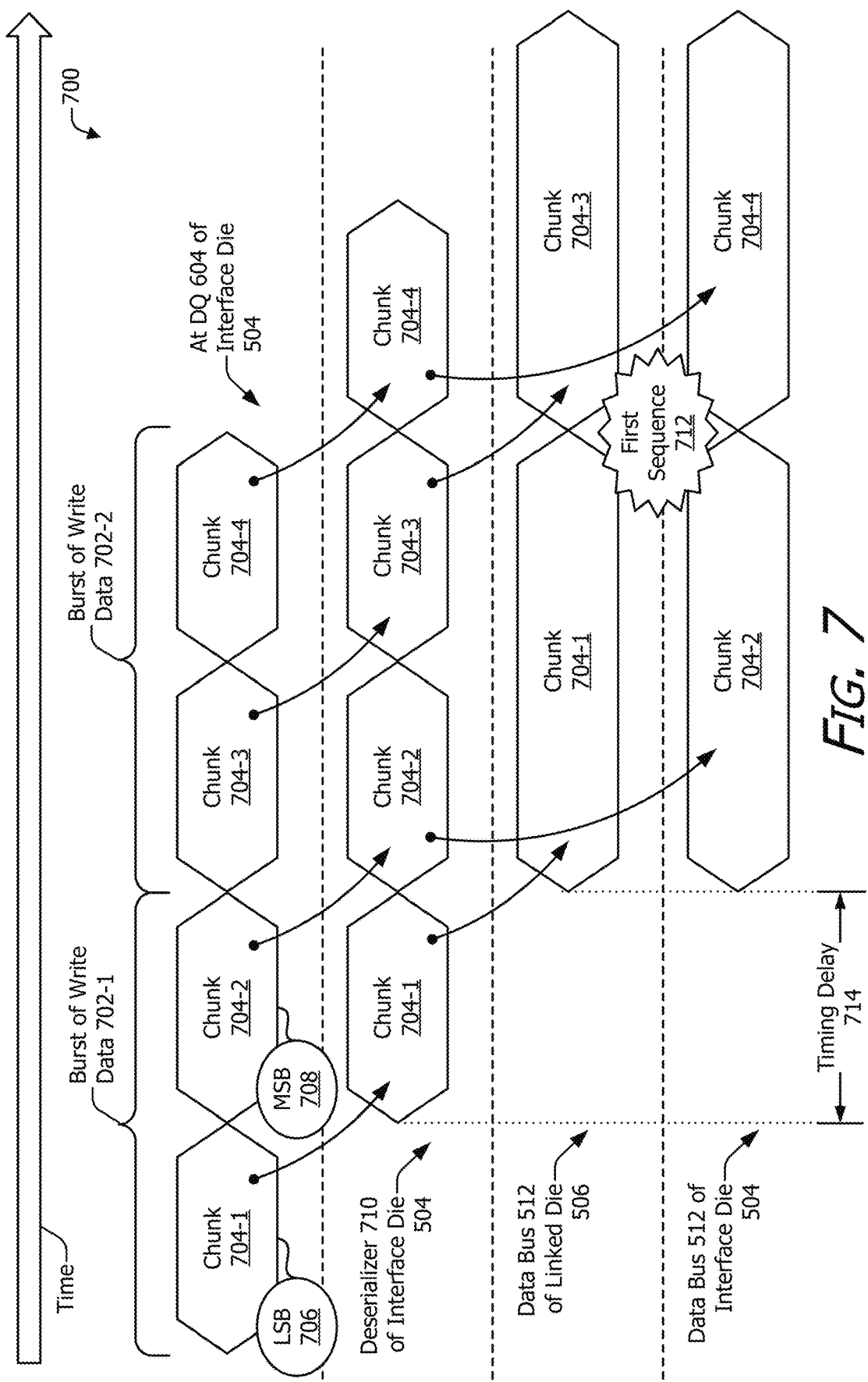
FIG. 7 illustrates an example timing diagram of a write operation in accordance with an asymmetric read-write sequence.

FIG. 7 illustrates an example timing diagram 700 of a write operation in accordance with an asymmetric read-write sequence. In FIG. 7, time progresses from left to right. During a write operation, the interface die 504 receives, from the memory controller 114 or 418, bursts of write data 702 at the data pin 604. In this example, the bursts of write data 702 include a first burst of write data 702-1 and a second burst of write data 702-2. Each burst of write data 702 includes multiple chunks 704. For instance, the first burst of write data 702-1 includes a first chunk 704-1 and a second chunk 704-2. The second burst of write data 702-2 includes a third chunk 704-3 and a fourth chunk 704-4.

Each burst of write data 702 can include, for instance, 32 bytes in accordance with a mode of the memory device 108. In example implementations, the first chunk 704-1 can correspond to a lower 16 bytes, and the second chunk 704-2 can correspond to an upper 16 bytes. In other words, the first chunk 704-1 can include a least-significant byte 706 (LSB 706), and the second chunk 704-2 can include a most-significant byte 708 (MSB 708). In total, the first chunk 704-1 and the second chunk 704-2 represent the 32 bytes of the first burst of write data 702-1. Similarly, the third chunk 704-3 can represent a lower 16 bytes, and the fourth chunk 704-4 can represent an upper 16 bytes of the second burst of write data 702-2. Bursts of write data 702 can, however, be of different lengths, such as 16 bytes. In this case, each chunk 704 can represent 8 bytes of the burst of write data 702.

In some implementations, as each chunk 704 is received, the interface die 504 passes the chunk 704 through a deserializer 710 of the interface die 504. The deserializer 710 can be implemented as part of the control circuitry 208. In general, the deserializer 710 operates in a pipelined fashion on a previously received chunk 704 as a next chunk 704 is received at the data pin 604 of the interface die 504. For example, the deserializer 710 operates on the first chunk 704-1 as the interface die 504 receives the second chunk 704-2 from the memory controller 114 or 418.

After deserialization, the interface die 504 passes the chunk 704 to a data bus 512 of the linked die 506 or a data bus 512 of the interface die 504 in accordance with a first sequence 712. The data buses 512 can be implemented, for instance, as part of the respective interfaces 206 of these interconnected dies 120.

The first sequence 712 indicates an order or sequence in which consecutive chunks 704 of a burst of write data 702 are passed to the data buses 512 of the interconnected dies 120. According to the first sequence 712, the first chunk 704-1 is passed to the data bus 512 of the linked die 506, and the second chunk 704-2 is passed to the data bus 512 of the interface die 504. The first sequence 712 is maintained for subsequent bursts of write data 702. For example, the third chunk 704-3 is passed to the data bus 512 of the linked die 506, and the fourth burst of write data 702-4 is passed to the data bus 512 of the interface die 504. In this manner, the linked die 506 writes odd-numbered chunks 704 to its memory array 204 (when starting to count from one), and the interface die 504 writes even-numbered chunks 704 to its memory array 204 (when starting to count from one).

There is a timing delay 714 associated with passing a chunk 704 from the interface die 504 to the linked die 506. This timing delay 714 corresponds with the time it takes for the interface die 504 to transfer a chunk 704 to the linked die 506 through the interconnect 508. In relative contrast, there is not a substantial time delay associated with passing a chunk 704 from the deserializer 710 to the data bus 512 of the interface die 504 because these components are each within, or part of, the interface die 504.

Due to the first sequence 712, a chunk 704 can be transferred to the linked die 506 as a following chunk 704 is received. For example, the interface die 504 transfers at least a portion of the first chunk 704-1 through the interconnect 508 to the linked die 506 while at least a portion of the second chunk 704-2 is received. In this way, the first chunk 704-1 can be present at the data bus 512 of the linked die 506 at approximately the same time that (or at least closer to the time that) the second chunk 704-2 is present at the data bus 512 of the interface die 504 (relative to an opposite order). This enables the first chunk 704-1 and the second chunk 704-2 to be written to the respective memory arrays 204 of the linked die 506 and the interface die 504 at approximately the same time, or at least with some overlap to reduce the total write latency. By transferring the first chunk 704-1 to the linked die 506 instead of the second chunk 704-2 to the linked die 506, the presence of the timing delay 714 can be masked such that an overall timing of the write operation can be impacted less, if at all, by the timing delay 714.

Figure 8:
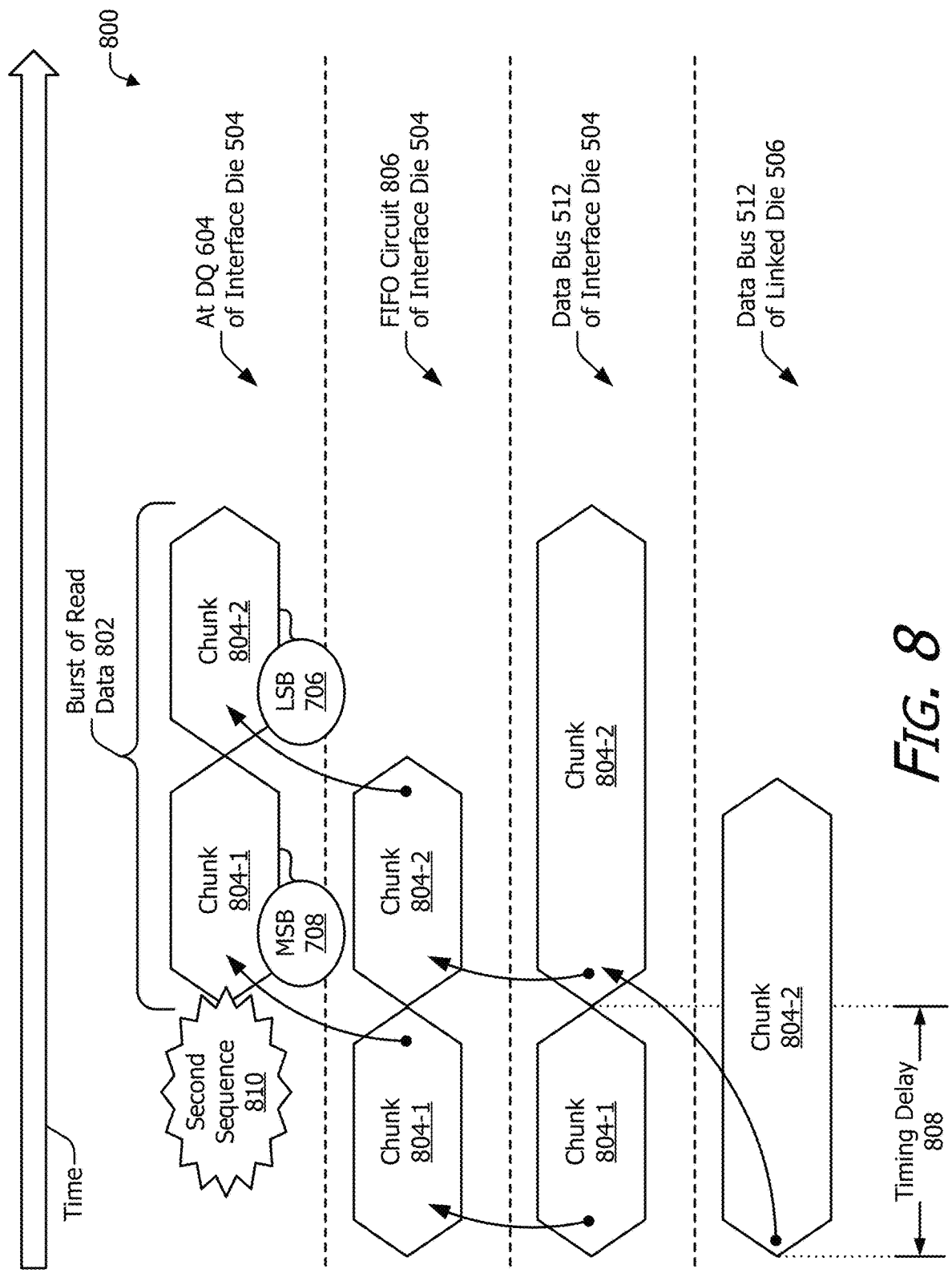
FIG. 8 illustrates an example timing diagram of a read operation in accordance with an asymmetric read-write sequence.

FIG. 8 illustrates an example timing diagram 800 of a read operation in accordance with an asymmetric read-write sequence. In FIG. 8, time progresses from left to right. During a read operation, the interface die 504 transmits a burst of read data 802 to the memory controller 114 or 418. The burst of read data 802 includes a first chunk 804-1 and a second chunk 804-2. The burst of read data 802 can include, for instance, 32 bytes in accordance with a mode of the memory device 108. In example implementations, the first chunk 804-1 can correspond to an upper 16 bytes, and the second chunk 704-2 can correspond to a lower 16 bytes. In other words, the first chunk 804-1 can include a most-significant byte 708, and the second chunk 804-2 can include the least-significant byte 706. In total, the first chunk 704-1 and the second chunk 704-2 represent 32 bytes. Bursts of read data 802 can, however, be of different lengths, such as 16 bytes. In this case, each chunk 804 can represent 8 bytes of the burst of read data 802.

To transmit the burst of read data 802 to the memory controller 114 or 418, the interface die 504 reads the first chunk 804-1 from its memory array 204 and passes the first chunk 804-1 to a first-in first-out (FIFO) circuit 806 of the interface die 504 using the data bus 512 thereof. The first-in first-out circuit 806 can be implemented as part of the control circuitry 208 and/or the interface 206 of the interface die 504. In general, the first-in first-out circuit 806 operates in a pipelined fashion.

During this time, the linked die 506 reads the second chunk 804-2 from its memory array 204 and transfers the second chunk 804-2 to the interface die 504 using the data bus 512 thereof and the interconnect 508. A timing delay 808 is associated with transferring the second chunk 804-2 from the data bus 512 of the linked die 506 to the data bus 512 of the interface die 504. The timing delay 808 corresponds with the time it takes for the linked die 506 to transfer the second chunk 804-2 to the interface die 504 through the interconnect 508.

Meanwhile, the interface die 504 transmits the first chunk 804-1 to the memory controller 114 or 418 via the data pin 604. In some cases, as the first chunk 804-1 is transmitted, the interface die 504 receives the second chunk 804 from the linked die 506 and passes the second chunk 804-2 to the first-in first-out circuit 806 using the data bus 512 thereof. The interface die 504 transmits the second chunk 804-2 to the memory controller 114 or 418 via the data pin 604. By transmitting the first chunk 804-1, as read from the interface die 504, before transmitting the second chunk 804-2, as read from the linked die 506, the timing delay 808 can occur with at least some overlap as the interface die 504 transmits the first burst of read data 802-1. As such, the presence of the timing delay 808 can be masked such that an overall timing of the read operation can be impacted less, if at all, by the timing delay 808.

A second sequence 810 indicates an order or sequence in which consecutive chunks 804 of a burst of read data 802 are read from the interconnected dies 120. According to the second sequence 810, the first chunk 804-1 is read from the memory array 204 of the interface die 504, and the second chunk 804-2 is read from the memory array 204 of the linked die 506. Although not explicitly shown, the second sequence 810 can be maintained for subsequent bursts of read data 802. In this manner, the interface die 504 reads and provides odd-numbered chunks 804 (when starting to count from one) chunks 804, and the linked die 506 reads and provides even-numbered chunks 804 (when starting to count from one) of read data 802.

The second sequence 810 represents an opposite or reverse sequence of the first sequence 712. For example, the odd-numbered chunks 704 (when starting to count from one) are written to the linked die 506, and the even-numbered chunks 704 (when starting to count from one) are written to the interface die 504. In contrast, odd-numbered chunks 804 (when starting to count from one) are read from the interface die 504, and even-numbered chunks 804 (when starting to count from one) are read from the linked die 506. Consider a situation in which a 32-byte burst of data is written to and read from the interconnected dies 120. The 32 bytes of data include a lower 16 bytes as a first chunk of data and an upper 16 bytes as a second chunk of data. In this case, the upper 16 bytes is provided by the memory controller 114 or 418 to the interface die 504 as the second chunk 704-2 after providing the lower 16 bytes as the first chunk 704-1. According to the asymmetric read-write sequence, the lower 16 bytes of data are written to the linked die 506 as the first chunk 704-1, and the upper 16 bytes are written to the interface die 504 as the second chunk 704-2. During the read operation, the interface die 504 reads the upper 16 bytes of data as the first chunk 804-1, and the linked die 506 reads the lower 16 bytes of data as the second chunk 804-2. In particular, interface die 504 transmits the lower 16 bytes of the burst of read data 802 to the memory controller 114 or 418 after transmitting the upper 16 bytes of the burst of read data 802. In summation, the burst of read data 802 transmitted to the memory controller 114 or 418 is in an opposite order compared to the burst of write data 702 received from the memory controller 114 or 418. More specifically, although the lower 16 bytes of the burst of write data 702 is received first during a write operation, the asymmetric read-write sequence causes the upper 16 bytes of the burst of read data 802 to be transmitted first during a read operation.

In this sense, the first sequence 712 and the second sequence 810 can also represent different chunk sequences, or byte orders, of data that passes through the interconnect 106 or 602. For example, the first sequence 712 indicates that a lower set of bytes is transferred across the interconnect 106 or 602 prior to an upper set of bytes for write operations. In contrast, the second sequence 810 indicates that the upper set of bytes is transferred across the interconnect 106 or 602 prior to the lower set of bytes for read operations. These example chunk or byte orders may, however, be swapped between read and write operations.

Example Methods

Figure 9:
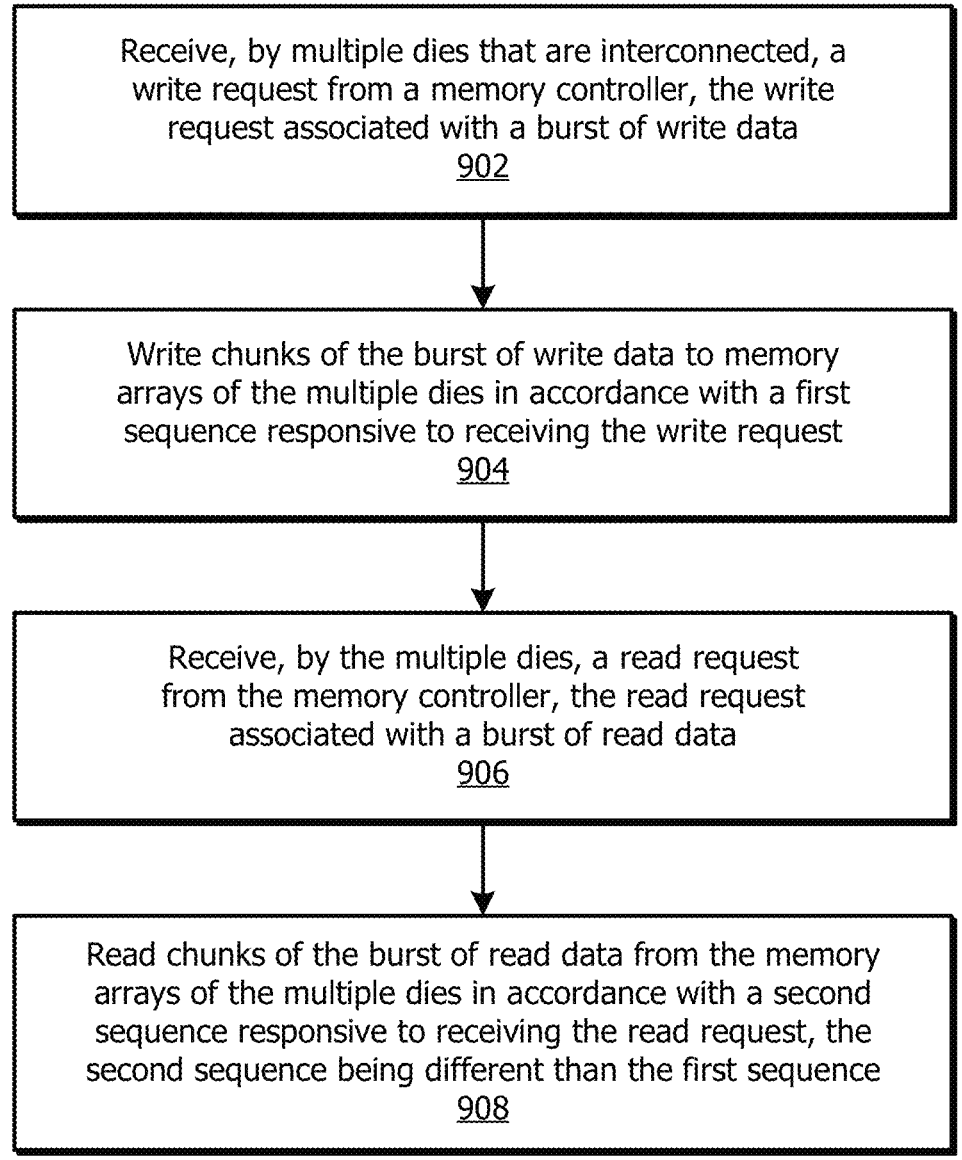
FIG. 9 illustrates an example method for implementing an asymmetric read-write sequence for interconnected dies.
Figure 10:
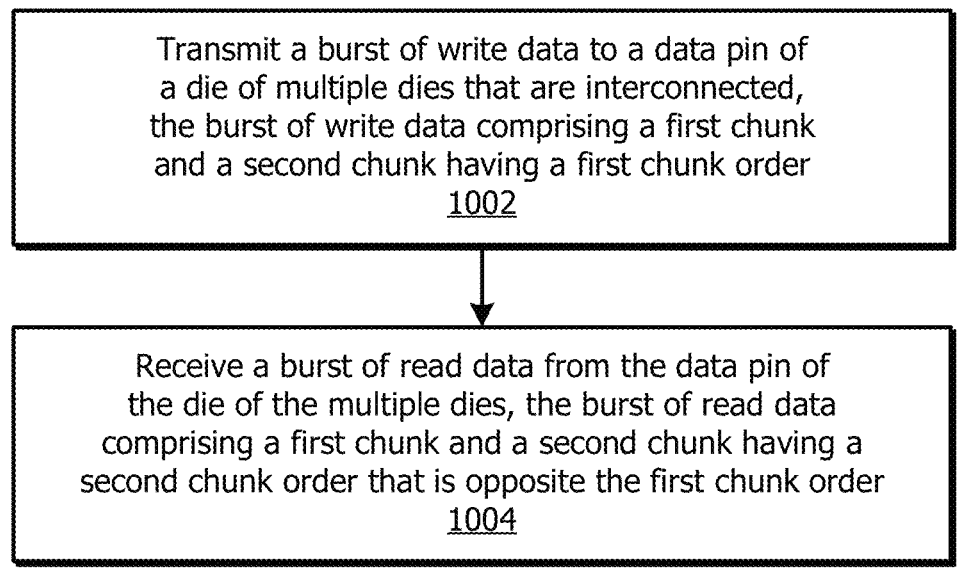
FIG. 10 illustrates an example method for implementing an asymmetric read-write sequence for interconnected dies.

This section describes example methods for implementing an asymmetric read-write sequence for interconnected dies with reference to the flow charts and flow diagrams of FIGS. 9 and 10. These descriptions may also refer to components, entities, and other aspects depicted in FIGS. 1-6 by way of example only. The described methods are not necessarily limited to performance by one entity or multiple entities operating on one device.

FIG. 9 illustrates a flow diagram 900, which includes operations 902 through 908. These operations can be performed by a memory device 108 to implement aspects of an asymmetric read-write sequence for interconnected dies. At 902, multiple dies that are interconnected within a memory device 108 receive a write request from a memory controller 114 or 418. For example, the interconnected dies 120 receive the write request from the memory controller 114 or 418. The write request can represent a memory command 424 shown in FIG. 4. The write request is associated with a burst of write data 702.

At 904, the memory device 108 writes chunks 704 of the burst of write data 702 to the memory arrays 204 of the multiple dies 120 in accordance with a first sequence 712 responsive to receiving the write request. For example, the linked die 506 writes a first chunk 704-1 of the burst of write data 702, and the interface die 504 writes a second chunk 704-2 of the burst of write data 702, as shown in FIG. 7. The first chunk 704-1 can correspond to a lower set of bytes, and the second chunk 704-2 can correspond to an upper set of bytes.

At 906, the multiple dies 120 of the memory device 108 receive a read request from the memory controller 114 or 418. The read request can represent a memory command 424 shown in FIG. 4. The request is associated with a burst of read data 802.

At 908, the memory device 108 reads chunks 804 of the burst of read data 802 from the memory arrays 204 of the multiple dies 120 in accordance with a second sequence 810 responsive to receiving the read request. For example, the interface die 504 reads the first chunk 804-1 from the memory array 204 thereof, and the linked die 506 reads the second chunk 804-2 from the memory array 204 thereof. The second sequence 810 is different than the first sequence 712. In some aspects, the second sequence 810 can be considered a reverse order or an opposite order relative to the first sequence 712.

FIG. 10 illustrates a flow diagram 1000, which includes operations 1002 through 1004. These operations can be performed by a memory controller 114 or 418 to implement aspects of an asymmetric read-write sequence for interconnected dies. At 1002, the memory controller 114 or 418 transmits a burst of write data 702 to a data pin 604 of a die of multiple dies that are interconnected (e.g., from the interface die 504 of the set of interconnected dies 510). The burst of write data 702 includes a first chunk 704-1 and a second chunk 704-2, which have a first chunk order. The first chunk order can indicate, for example, that the first chunk 704-1 is associated with a lower set of bytes, and that the second chunk 704-2 is associated with an upper set of bytes. The memory controller 114 or 418 transmits the first chunk 704-1 prior to transmitting the second chunk 704-2.

At 1004, the memory controller 114 or 418 receives a burst of read data 802 from the data pin 604 of the die of the multiple dies that are interconnected (e.g., from the interface die 504 of the set of interconnected dies 510). The burst of read data 802 includes a first chunk 804-1 and a second chunk 804-2, which have a second chunk order that is opposite the first chunk order. The second chunk order can indicate, for example, that the first chunk 804-1 is associated with an upper set of bytes, and the second chunk 704-2 is associated with a lower set of bytes. The memory controller 114 or 418 receives the first chunk 804-1 prior to receiving the second chunk 804-2.

In another example, the first chunk order can indicate that the first chunk 704-1 is associated with an upper set of bytes, and that the second chunk 704-2 is associated with a lower set of bytes. In this case, the second chunk order can indicate that the first chunk 804-1 is associated with a lower set of bytes, and that the second chunk 804-2 is associated with an upper set of bytes.

In general, the asymmetric read-write sequence causes the second chunk order to be opposite the first chunk. As such, the memory controller 114 or 418 can perform an additional operation to cause data associated with the write and read operations to have a same order when communicated with another entity, such as the processor 110. For example, the memory controller 114 or 418 can transmit, to the processor 110, the second chunk 804-2 of the burst of read data 802 prior to transmitting the first chunk 804-1 of the burst of read data 802.

For the flow charts and flow diagrams described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods or operations may be implemented in, for example, hardware (e.g., fixed-logic circuitry or a processor in conjunction with a memory), firmware, or some combination thereof. The methods may be realized using one or more of the apparatuses, systems, or components shown in FIGS. 1-6, the components of which may be further divided, combined, rearranged, and so on. The devices, systems, and components of these figures generally represent firmware, such as executable-code or the actions thereof; hardware, such as electronic devices, packaged modules, IC chips, or circuits; software, such as processor-executable instructions; or a combination thereof. The illustrated apparatuses 102 and components of 200, include, for instance, a memory controller 114, an interconnect 106, and a memory device 108. FIGS. 1-6 illustrate some of the many possible systems or apparatuses capable of implementing the described methods.

Computer-readable media includes both non-transitory computer storage media and communication media including any medium that facilitates transfer of a computer program (e.g., an application) or data from one entity to another. Non-transitory computer storage media can be any available medium accessible by a computer, such as RAM, ROM, Flash, EEPROM, optical media, and magnetic media.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although aspects of implementing an asymmetric read-write sequence for interconnected dies have been described in language specific to certain features and/or methods, the subject of the appended claims is not necessarily limited to the specific features or methods described. Rather, the specific features and methods are disclosed as a variety of example implementations of implementing an asymmetric read-write sequence for interconnected dies.

What is claimed is:

1. An apparatus comprising:
a first die comprising:
a first data pin configured to be coupled to a memory controller;
a second data pin; and
a memory array; and
a second die comprising:
a third data pin coupled to the second data pin of the first die; and
a memory array,
the first die and the second die jointly configured to perform an asymmetric read-write sequence using the first data pin of the first die, the second data pin of the first die, the third data pin of the second die, the memory array of the first die, and the memory array of the second die, the asymmetric read-write sequence relating to performance of a read operation in accordance with a first sequence and performance of a write operation in accordance with a second sequence different from the first sequence.

2. The apparatus of claim 1, further comprising:
a substrate,
wherein the first die and the second die are disposed on the substrate.

3. The apparatus of claim 2, further comprising:
a package, the package comprising the first die, the second die, and the substrate.

4. The apparatus of claim 1, wherein the second sequence is opposite the first sequence.

5. The apparatus of claim 1, wherein the first die and the second die are jointly configured to:
receive a write request from the memory controller, the write request associated with a burst of write data;
write chunks of the burst of write data to the memory array of the first die and the memory array of the second die in accordance with the first sequence responsive to receiving the write request;
receive a read request from the memory controller, the read request associated with a burst of read data; and
transmit chunks of the burst of read data from the memory array of the first die and the memory array of the second die in accordance with the second sequence responsive to receiving the read request.

6. The apparatus of claim 5, wherein:
the first die is configured to:
receive, via the first data pin of the first die, the chunks of the burst of write data from the memory controller, the chunks of the burst of write data comprising a first chunk and a second chunk;
transfer, via the second data pin of the first die, the first chunk to the second die; and
write the second chunk to the memory array of the first die in accordance with the first sequence; and
the second die is configured to:
receive, via the third data pin of the second die, the first chunk; and
write the first chunk to the memory array of the second die in accordance with the first sequence.

7. The apparatus of claim 6, wherein the first die is configured to receive the first chunk prior to receiving the second chunk.

8. The apparatus of claim 6, wherein the first die and the second die are jointly configured to perform the asymmetric read-write sequence to cause at least part of a timing delay associated with the transfer of the first chunk from the first die to the second die to occur during at least a portion of time that the first die receives the second chunk from the memory controller.

9. The apparatus of claim 6, wherein the first die is configured to write at least a portion of the second chunk to the memory array of the first die while the second die writes at least a portion of the first chunk to the memory array of the second die.

10. The apparatus of claim 6, wherein:
the first chunk comprises a least-significant byte of the burst of write data; and
the second chunk comprises a most-significant byte of the burst of write data.

11. The apparatus of claim 5, wherein:
the chunks of the burst of read data comprises a first chunk and a second chunk;
the first die is configured to:
read the first chunk from the memory array of the first die in accordance with the second sequence;
transmit, via the first data pin of the first die, the first chunk to the memory controller;
receive, via the second data pin of the first die, a second chunk of the chunks of the read data from the second die; and
transmit, via the first data pin of the first die, the second chunk to the memory controller; and
the second die is configured to:
read the second chunk from the memory array of the second die in accordance with the second sequence; and
transfer, via the third data pin of the second die, the second chunk to the first die.

12. The apparatus of claim 11, wherein the first die is configured to transmit the first chunk prior to transmitting the second chunk.

13. The apparatus of claim 11, wherein the first die and the second die are jointly configured to perform the asymmetric read-write sequence to cause at least part of a timing delay associated with the transfer of the second chunk to the first die to occur during at least a portion of time that the first die transmits the first chunk to the memory controller.

14. The apparatus of claim 11, wherein the first die is configured to transmit at least a portion of the first chunk to the memory controller while the second die transfers at least a portion of the second chunk to the first die.

15. The apparatus of claim 1, further comprising:
a third die comprising:
a fourth data pin configured to be coupled to the memory controller;
a fifth data pin; and
a memory array; and
a fourth die comprising:
a sixth data pin coupled to the fifth data pin of the third die; and
a memory array,
the third die and the fourth die jointly configured to perform another asymmetric read-write sequence.

16. The apparatus of claim 1, wherein the second die comprises a fourth data pin, the fourth data pin configured to be inactive.

17. The apparatus of claim 16, wherein the fourth data pin is configured to be operably decoupled from the memory controller during performance of the asymmetric read-write sequence.

18. The apparatus of claim 1, further comprising:
the memory controller coupled to the first die and the second die.

19. The apparatus of claim 18, wherein:
the apparatus comprises a Compute Express Link® (CXL®) device; and
the memory controller is coupled to the first die and the second die via an interconnect that is internal to the CXL device.

20. A method jointly performed by a first die of a memory device and a second die of the memory device, the method comprising:
performing an asymmetric read-write sequence using a first data pin of the first die, a second data pin of the first die, a third data pin of the second die that is coupled to the second data pin of the first die, a memory array of the first die, and a memory array of the second die, the first data pin coupled to a memory controller, the performing of the asymmetric read-write sequence comprising:
performing a read operation in accordance with a first sequence; and
performing a write operation in accordance with a second sequence that is different from the first sequence.

* * * * *